United States Patent [19]

Bekefi

[11] Patent Number: 5,363,054
[45] Date of Patent: Nov. 8, 1994

[54] DOUBLE BEAM CYCLOTRON MASER

[75] Inventor: George Bekefi, Brookline, Mass.

[73] Assignee: Massachusetts Institute of Technology, Cambridge, Mass.

[21] Appl. No.: 842,246

[22] Filed: Feb. 27, 1992

[51] Int. Cl.[5] .......................... H01S 3/30; H01J 23/08
[52] U.S. Cl. ....................... 330/4; 330/4.7; 372/2; 313/62
[58] Field of Search ............ 330/4, 4.7; 372/2, 37; 313/62

[56] References Cited

U.S. PATENT DOCUMENTS

| | | | |
|---|---|---|---|
| 4,422,045 | 12/1983 | Barnett | 330/4 |
| 4,530,096 | 7/1985 | Bekefi et al. | 372/2 |
| 4,533,875 | 8/1985 | Lau | 330/4 |
| 4,679,197 | 7/1987 | Hsu | 372/2 |

FOREIGN PATENT DOCUMENTS 897039 9/1989 U.S.S.R. .

OTHER PUBLICATIONS

Hartemann et al, Phys. Fluids, vol. 30, No. 10, pp. 3283–3288, Oct. 1987, abstract only provided herewith.
Bekefi, G.; Nucl. Instrum. Method, Phys. Res. A. Accel. Spectram. Detect. Assoc., Aug. 30, 1991, vol. A318, No. 1-3, pp. 243–246.
Bekefi et al, Jnl. Appl. Phys., vol. 53, pp. 4113–4121, Jun. 1982; abst. only herewith.

Primary Examiner—Nelson Moskowitz
Attorney, Agent, or Firm—Greenfield & Sacks

[57] ABSTRACT

A double beam cyclotron maser comprising two electron guns for introducing two electron beams traveling parallel to each other at different speeds into an electron drift tube/waveguide. The beams have respectively different electron cyclotron space-charge harmonics. A solenoid maintains a magnetic field parallel to the direction of propagation of the electron beams while a magnetic wiggler field initially imparts a transverse force to the electrons such that they propagate down the drift tube with a helical gyration. The magnetic fields, electron beam velocities, and beam space charge harmonics are adjustable to set the interaction frequency at which amplification of electromagnetic radiation can occur. The waveguide is a slow wave structure so configured as to slow the signal from the magnetron to match the phase velocity of the double stream cyclotron space-charge wave.

20 Claims, 3 Drawing Sheets

DOUBLE BEAM CYCLOTRON MASER

This invention was made with government support under contract No. AFOSR-89-0082 awarded by the Air Force. The government has certain rights in the invention.

FIELD OF THE INVENTION

The invention pertains to a new free electron cyclotron maser. More particularly, the invention pertains to a double stream cyclotron maser in which the electrons in the electron beams are imparted with a helical gyration.

BACKGROUND OF THE INVENTION

Lasers produce an intense, coherent beam of light which is useful in many applications, including, for instance, medical surgery, fiberoptic communications, weapons, industrial heating and cutting, and radar. The term laser is an acronym for Light Amplification by Stimulated Mission of Radiation. Although the term laser is specific to electromagnetic radiation in the light frequency spectrum, apparatus are known for amplifying many frequencies of electromagnetic radiation by the stimulated emission of radiation. For instance, the term maser is an acronym for Microwave Amplification by Stimulated Emission of Radiation. The terms "laser" and "maser" are used interchangeably herein and are not intended to be frequency specific but to denote any device for amplifying electromagnetic energy by stimulated emission of radiation.

In present masers/lasers, an input electromagnetic wave can be amplified because, under proper conditions, an electron which is struck by a photon emits a photon coherent with the striking photon. The electron does not absorb the striking photon and thus the population of photons increases. More and more photons are produced until the system reaches saturation, at which point the number of photons, and thus the electromagnetic output power, cannot further increase.

Atomic lasers are the most common type of lasers. They amplify radiation at well-defined wavelengths which correspond to discrete energy transitions which may occur within the atoms which comprise the lasing medium of such lasers. For instance, an argon atomic laser produces light only of a distinct wavelength corresponding to the energy transitions which occur within argon atoms. In atomic lasers, different frequencies of electromagnetic radiation can be generated by using different lasing media.

The present invention is not an atomic laser/maser but rather belongs to another class of lasers/masers which depend on the interaction of electrons traveling in free space. Since such electrons are not tied to an atom, they are not limited to specific energy transitions within an atom. Such lasers/masers can produce radiation, over a broad range of frequencies, and in theory, throughout the entire electromagnetic spectrum, by proper control of system operating parameters. In practice, these devices are particularly adaptable for amplifying radiation in the microwave and millimeter ranges (i.e., as masers), which includes wavelengths from about 1 decameter to about 1 millimeter.

A double stream amplifier is one such radiation amplification device that operates based on the interaction of free electrons. Double stream amplifiers depend on mutual electron bunching of two beams to produce electromagnetic radiation of useful power. The power that can be emitted from a stream of electrons is normally only the power of each electron multiplied by the number of electrons. However, Maxwell's equations dictate that if electrons are "bunched" together in a group much smaller than the wavelength of the emitted radiation, the power of the radiation is given by the power of each electron in the bunch multiplied by the square of the number of electrons in the bunch. Bunching is necessary to cause stimulated emission of radiation of a useful amount.

A double stream amplifier amplifies electromagnetic radiation through the space-charge electric field interaction of two distinct streams of electrons traveling in vacuo in the same space at slightly different velocities parallel to one another. (The double stream amplifier was first introduced in 1949 by Andrew Haeff, Haeff, Andrew V., *The Electron-Wave Tube—A Novel Method of Generation and Amplification of Microwave Energy*, Proceedings of the I.R.E., January 1949.) In a double stream amplifier, two electron guns inject two beams of electrons parallel to one another into an axial magnetic guide field within an electron drift tube. The beams can have low velocities as in the experiments of Haeff, or they can have relativistic velocities (more than about 10% of the speed of light) with one beam traveling slightly slower than the other as in calculations of G. Bekefi and K. D. Jacobs, J. Appl. Physics, 53, 4113 (1982). As predicted by the statistical laws of entropy, the electrons comprising the high energy (higher velocity) beam tend to lose energy to the electrons of the low energy (lower velocity) beam, which tend to gain energy. This interchange of energy occurs through the interaction of the space charge electric fields associated with the faster and slower moving electrons. The result is that, on the average, the fast electrons slow down and the slow ones speed up.

As explained more fully in the above-referenced articles, the interaction of the two beams and a disturbance (an electromagnetic wave which may be injected or may be an ambient background "noise" wave) causes space charge density, i.e., electron bunching, and stimulated emission of radiation by the electrons.

Figure 1:
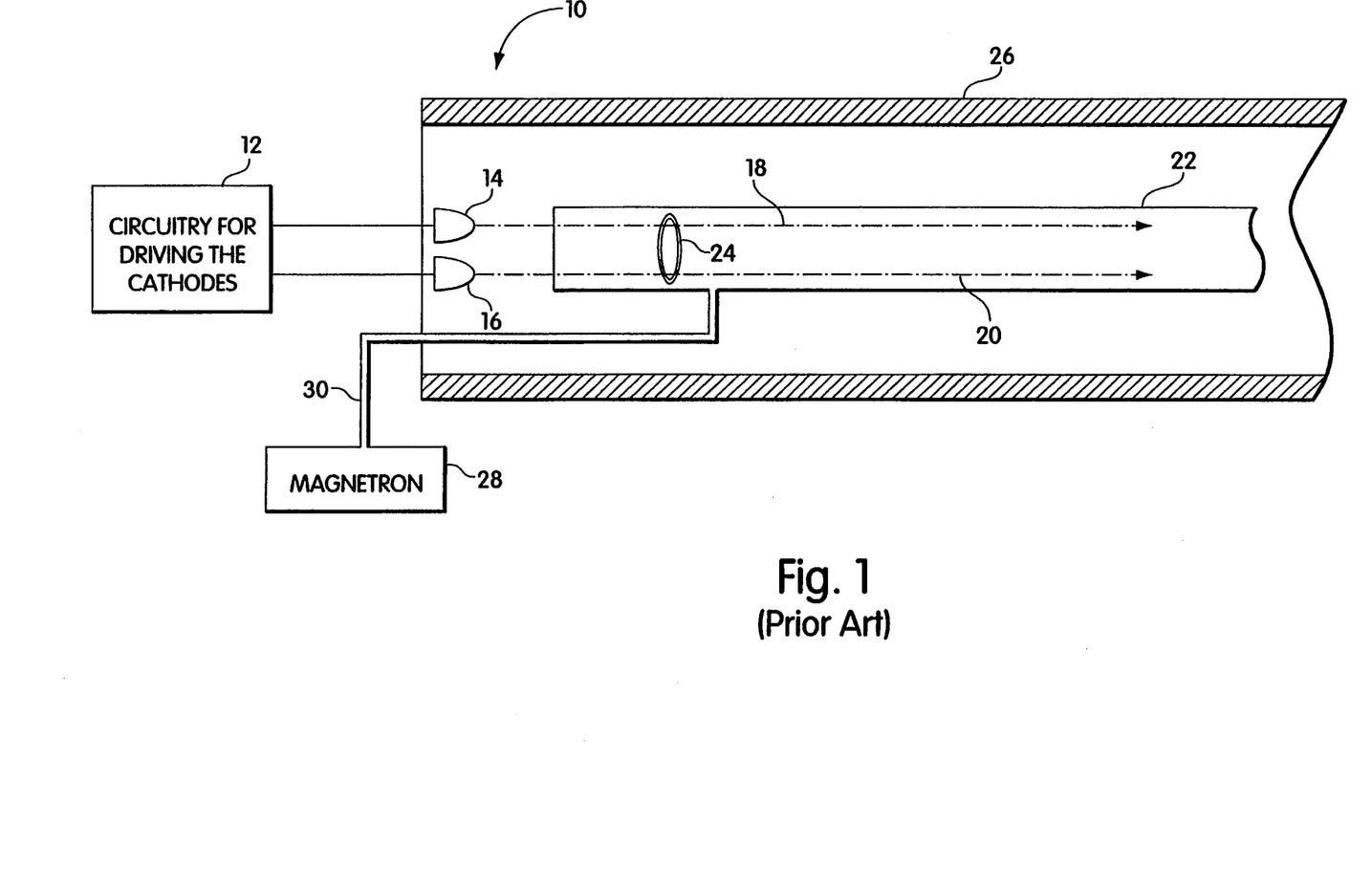
FIG. 1 is a simplified schematic diagram of a double stream amplifier of the prior art.

FIG. 1 illustrates a typical double stream amplifier 10 of the prior art. Circuitry 12 is provided to drive first and second cathodes 14 and 16 to inject first and second electron beams 18 and 20 into an electron drift tube 22. The circuitry 12 for driving the cathodes is configured such that the electron beams 18 and 20 can (but need not) have relativistic speeds (i.e., at least about 10% the speed of light) which are slightly different from each other.

Although the beams are shown distinctly as 18 and 20 in the figure, it should be understood that the electrons of the beams interact in the tube and are not physically separated by a distance more than a wavelength of the radiation. A solenoid 26 is electrically charged to provide an axial magnetic field in the drift tube parallel to the longitudinal axis of the drift tube, and thus parallel to the direction of propagation of the electrons. An RF source (for example, a magnetron 28) generates an electromagnetic wave of the interaction frequency of the system which is directed from the magnetron into the drift tube through a configuration of waveguides 30. The interaction frequency is a function of various parameters of the system which may be adjusted to provide the desired frequency. The interaction frequency is given by:

$$\omega_{int} \approx 2(\beta_{\parallel}^2 \gamma 81)(\gamma_{\parallel}/\Delta\gamma_{\parallel})\omega_p$$

where, $\beta_{\parallel}$ = average parallel velocity of electrons normalized by the speed of light, i.e., $v_{par}/c$, $\gamma_{\parallel}$ = average parallel kinetic energy parameter of the electrons in the tube, $\Delta\gamma_{\parallel}$ = difference in the parallel kinetic energies of the two beams, and $$\omega_p = \left(\frac{Ne^2}{m\epsilon_0\gamma}\right)^{\frac{1}{2}} = \text{plasma frequency,}$$

where,

N = number of electrons per cubic meter,
e = charge of an electron = $1.602 \times 10^{-19}$ C,
m = mass of an electron = $9.1 \times 10^{-31}$ kg
$\epsilon_0$ = permitivity of free space = $8.85 \times 10^{-12}$ farad/meter
$\gamma$ = average total energy parameter of the electrons.

Amplification of the magnetron wave at the interaction frequency occurs due to the mutual interaction of charge density perturbations (electron bunching) of the two co-propagating electron beams traveling at different speeds.

The efficiency of conventional double stream amplifiers is fairly low, typically on the order of less than 10%. This is because the large gain in such amplifiers causes rapid electron thermalization, which tends to destroy the two-beam nature of the system. Efficiency is the percentage of the power in the electron beam which is converted into emitted radiation power. The power in the electron beam is simply the voltage times the current.

Another drawback of the double stream amplifier is that its output frequency fluctuates. In a double stream amplifier, the radiation frequency is proportional to the square root of the electron number density (i.e., the square root of the current), which is not readily controlled under present day electron beam generator technology. The fluctuations in the space charge density (i.e., current) result in poor frequency stability and the amplified signal tends to be noisy.

In another type of laser/maser, known as a free electron laser/maser, stimulated emission of radiation is induced by the interaction of (1) a single stream of free traveling electrons, (2) an undulating magnetic field (typically produced by a magnetic wiggler) which causes the electrons to gyrate transverse to their direction of propagation, and (3) an electromagnetic wave traveling in the same direction as the electrons.

In a free electron laser/maser, an electron beam is injected in vacuo into an electron drift tube often having an axial magnetic guide field parallel to the direction of propagation of the electrons. The guide field holds the electron beam together because, in the absence of the field, the electrons would disperse due to their natural tendency to repel one another.

Figure 2:
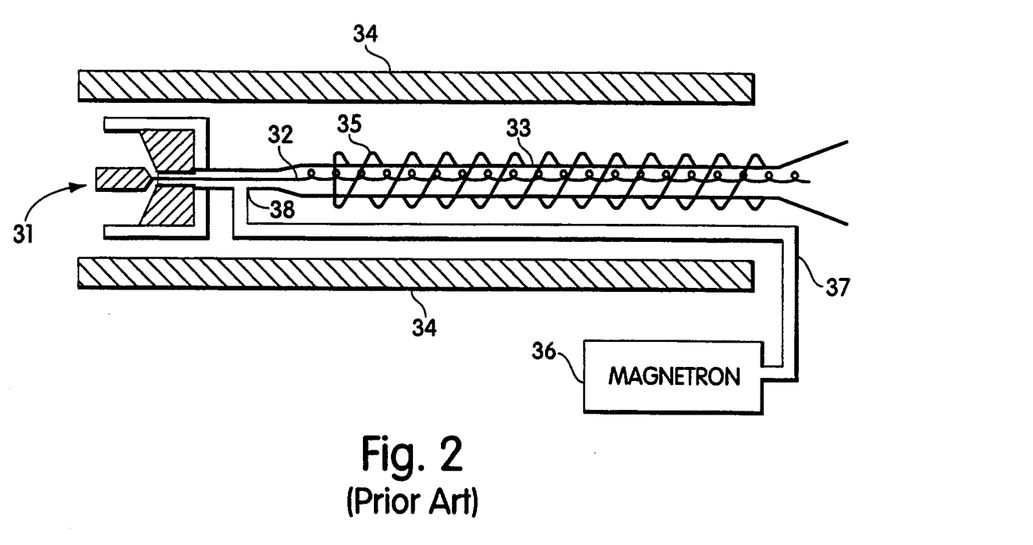
FIG. 2 is a simplified schematic diagram of a free electron laser/maser of the prior art.

FIG. 2 shows a typical prior art free electron maser. An electron gun 31 injects an electron beam 32 into an electron drift tube 33. A solenoid 34 produces a uniform axial magnetic field in the drift tube parallel to the direction of propagation of electrons. A magnetic wiggler 35 is driven with current to produce an undulating transverse magnetic force in the full length of the drift tube 33. The undulating magnetic field is selected to impart a transverse rotation to the electrons. A magnetron or other RF source 36 and waveguide configuration 37 inject an electromagnetic wave into the drift tube at 38. The wave injected by the magnetron should be of the desired output frequency of the maser.

When the electrons enter the wiggler magnetic field, their propagation changes from a straight line propagation to a helical propagation as they continue traveling parallel to the longitudinal axis of the tube. The wiggler field and electron beam velocity should be selected in accordance with the equation below such that the interaction frequency of the system corresponds to the desired output frequency (which should also be equal to the magnetron frequency);

$$\omega_{int} \approx (1+\beta_{\parallel})\gamma_{\parallel}^2(mk_\omega\beta_{\parallel}c)$$

where, $\beta_{\parallel}$ = average parallel velocity of electrons normalized by the speed of light, i.e., $v_{\parallel}/c$, $\gamma_{\parallel} = (1-\beta_{\parallel}^2)^{-\frac{1}{2}}$ = average parallel kinetic energy parameter of an electron in the tube m = 1, 2, 3 . . . and $k_\omega = 2\pi/l_\omega$, where $l_\omega$ is the periodicity of the wiggler field.

The gyrating relativistic electrons interact with the injected radiation to cause electron bunching and stimulated emission of radiation so as to amplify the magnetron input wave.

As is also true of double stream lasers, it is not necessary to inject a wave. In the absence of an injected wave, the laser would amplify an ambient background noise wave at or near the interaction frequency.

The operation of free electron lasers/masers is well known in the related art and various references are available should a more complete description of these masers be desired. For instance, the *Encyclopedia of Laser and Optical Technology*, Robert A. Meyers, Editor, Harcourt Brace Jovanovich, 1991, provides a detailed description of free electron masers as well as citations to additional references with more detailed descriptions.

A drawback of free electron lasers/masers is that they require large accelerators to produce electron beams of the required velocity and long wigglers to achieve sufficient gain. These requirements become particularly troublesome as the desired output frequency increases. These requirements limit the practical application of single stream free electron masers to a few laboratories.

A single beam electron cyclotron maser (CARM), yet another prior art system, operates on a different principle. The electrons undergo helical rotation in a uniform axial magnetic field after having acquired rotational motion by means of a short helical wiggler or kicker.

Figure 3:
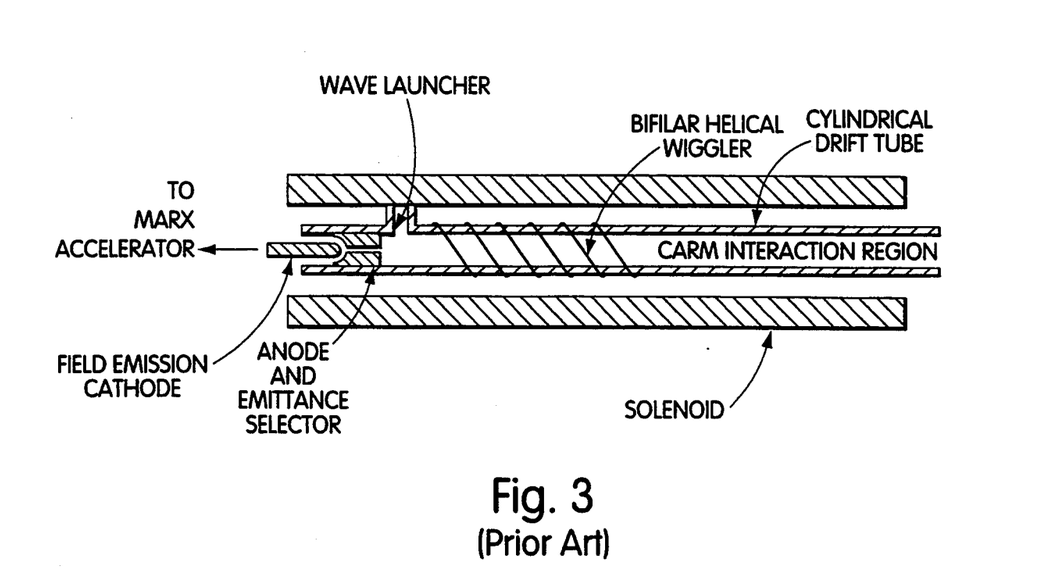
FIG. 3 is a simplified schematic diagram of a single stream cyclotron maser electromagnetic radiation amplification device of the prior art.

FIG. 3 shows a typical single beam electron cyclotron maser. The output frequency is given by $$\omega_{int} = (1+\beta_{\parallel})\gamma_{\parallel}^2 m\Omega$$

where $\Omega = e\beta_{\parallel}/m\gamma$ = the electron cyclotron frequency associated with the axial magnetic field.

W. Chunyi and S. Liu, *Double-Stream Electron Cyclotron Maser*, Int. J. Electronics, 1984, Vol. 57, No. 6, 1191–1204 disclose a double stream electron cyclotron maser operating in fast $TM_{o,1}$ or $TE_{o,1}$ electromagnetic empty waveguide modes. For interaction to occur in these modes, high axial magnetic fields and/or high beam energies, as well as positive cyclotron mode numbers on both beams are necessary. Theoretically this achieves high gain and broad band operation but no significant upshift in operating frequency.

Accordingly, it is an object of the present invention to provide a new high frequency double stream cyclotron laser/maser.

It is a further object of the present invention to provide a new double stream cyclotron laser/maser requiring much lower magnetic guide field strengths and beam energies compared to single stream free electron lasers/masers.

It is another object of the present invention to provide a double stream cyclotron laser/maser which can be energized by a table-top size particle accelerator.

It is yet another object of the present invention to provide a less noisy double stream laser/maser.

It is one more object of the present invention to provide an improved double stream laser/maser which outputs an extremely frequency stable output signal.

It is a further object of the present invention to provide a laser/maser which can produce higher frequency radiation with lower beam energy requirements than prior art lasers/masers.

It is a further object of the present invention to couple a growing slow space-charge wave of double stream cyclotron interaction to a slow wave electromagnetic structure.

It is yet another object of the present invention to incorporate a growing space-charge wave of double stream cyclotron interaction into a klystron-type geometry.

SUMMARY OF THE INVENTION

The present invention comprises an electromagnetic radiation amplification device in which two beams of electrons are caused to propagate in helical gyration in the same direction in the same space at slightly different relativistic speeds. The invention can produce output radiation over a broad range of frequencies, and theoretically throughout the electromagnetic spectrum, but is particularly adaptable for use in the microwave and millimeter ranges (i.e., as a maser). The invention comprises two electron guns which inject two beams of electrons into an electron drift tube. The electron drift tube is sized and dimensioned to also act as a waveguide for the electromagnetic wavelength which is to be output. A magnetic field solenoid positioned around the waveguide/drift tube produces an axial magnetic guide field in the drift tube parallel to the direction of propagation of the electrons. A short magnetic wiggler, or a magnetic kicker, is wrapped around a short section of the waveguide/drift tube and is driven to impart a transverse velocity to the electrons. Through the combination of the axial velocity imparted to the electrons by the electron gun and the transverse force imparted by the magnetic wiggler or kicker, the electrons then freely travel in helices parallel to the uniform axial magnetic field. The double-stream cyclotron maser interaction occurs in the wiggler-free region where the only force is the axial magnetic field.

In the present invention, the frequency of the emitted radiation is independent of the space charge number density in the drift tube or the wiggler periodicity as in the prior art. In the present invention, the interaction frequency is a function of both the axial magnetic field and the harmonic of the cyclotron frequency of the two electron beams. Accordingly, the frequency of the emitted radiation can be controlled very accurately since it is easy to accurately control the axial magnetic field. When the cyclotron harmonic of the first beam is set to be unequal to the cyclotron harmonic of the second beam, the frequency of the emitted radiation can be set to a very high frequency without the need for stronger magnetic fields or higher beam velocities.

DETAILED DESCRIPTION OF THE INVENTION

Figure 4:
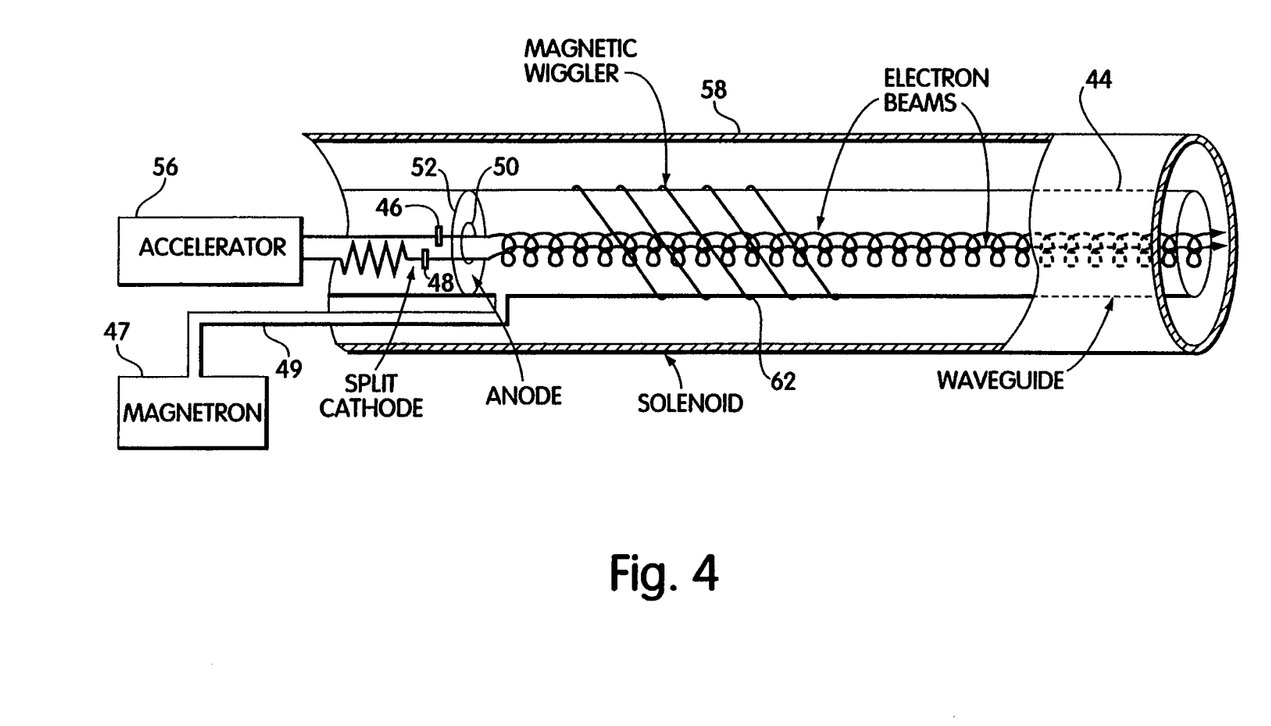
FIG. 4 is a simplified schematic diagram of a double stream cyclotron electromagnetic radiation amplification device of the present invention.

FIG. 4 is a simplified schematic diagram of the present invention which possesses many of the advantages of double stream amplifiers, free electron lasers, and cyclotron masers without their respective disadvantages.

Two electron beams 40 and 42 having different velocities are caused to travel through an electron drift tube 44. Various apparatus are known for generating co-propagating electron beams of different speeds. FIG. 4 shows one possible apparatus, a split cathode arrangement comprising cathodes 46 and 48 which inject the electron beams into drift tube 44 through aperture 50 of anode 52. Cathode 48 is coupled to the accelerator 56 through a resistor 54 such that the beam 42 emitted by cathode 48 travels at a lesser velocity than the beam 40 emitted by the cathode 46. The drift tube 44 is shaped and dimensioned to also function as a waveguide for the wave which is to be amplified. A solenoid 58 maintains an axial magnetic guide field within the drift tube parallel to the direction of propagation of the electrons. The parallel guide field keeps the electrons from dispersing, which they would otherwise do in free space due to their natural tendency to repel each other.

A short section of magnetic wiggler 62, driven by an electric current, exerts a transverse force on the electrons which adds a rotational component to the electrons' motion as they propagate down tube 44 such that their overall motion after passing through the wiggler field describes a helix parallel to the axial magnetic field.

Although a magnetic wiggler is preferred, there are other means which may be used for imparting the orbital rotation to the electrons. For instance, an electrically charged parallel plate capacitor placed around the drift tube could produce the necessary transverse electric force. A transverse magnetic kicker may be used also. Alternately, the electrons could be imparted with a gyration without the need for an additional magnetic field. The electron beams could be introduced into the axial magnetic guide field at an angle to the direction of the field. The guide field would cause the electrons to alter their course to propagate parallel to the field and, in doing so, would induce a rotation to the electrons as a result of the component of the magnetic force of the guide field transverse to the initial direction of the electrons.

Whatever means is chosen to produce the transverse force, it merely must initiate electron rotation and is not present throughout the length of the drift tube. Accordingly, in the preferred embodiment, a short section of bifilar wiggler is positioned near the input end of the drift tube. As will be explained in more detail herein, the axial magnetic field strength determines the rotational characteristics of the electron beams.

Through the combination of the axial drift of the electrons and the transverse circular rotation initiated by magnetic wiggler 62, the electrons describe helices as they propagate down the tube 44.

An RF source such as magnetron 47 introduces an electromagnetic wave at the desired interaction frequency into the drift tube 44 through a waveguide configuration 49. Alternately, the RF source can be deleted in which case the device would amplify ambient background radiation at or near the derjoe's interaction frequency.

The injected wave is amplified by the interaction of the two electron beams with each other and with the injected wave. The wave vector has both axial and transverse components. The transverse component is determined by the beam radius and the drift tube dimensions. The drift tube 44 is sized and dimensioned to act as a waveguide of the injected frequency, and particularly as a slow wave structure (such as a corrugated waveguide) to slow the injected wave to match the phase velocity of the double stream cyclotron space-charge wave. Alternately, the invention may be embodied in a klystron-type geometry.

Excitation of a space-charge wave at the cyclotron frequency (and any harmonics thereof) comes about solely because the transverse component of the magnetic field exerts a tangential force on the electrons in their helical motion. This orbital perturbation leads to harmonic generation. In order to obtain significant wave amplitude at a given harmonic, the perpendicular wavelength must be comparable in magnitude to the electron Larmor radius, i.e., $k_{perp} v_{perp} \Omega \approx 1$.

When the harmonics of the cyclotron frequency of the two electron beams, m and n, respectively, are selected such that $m = -n$, the interaction frequency of the double beam cyclotron maser of the present invention is given by:

$$\omega_{int} \approx 2(\beta_{\|}\gamma_{\|})^2(\gamma_{\|}/\Delta\gamma_{\|})(m\Omega) \qquad (1)$$

where, $\beta_{\|}$ = average parallel velocity of the electrons normalized by the speed of light, i.e., $v_{par}/c$, $\gamma_{\|}$ = average parallel kinetic energy parameter of an electron in the tube, $\Delta\gamma_{\|}$ = difference in the parallel kinetic energy parameter of the two beams, $m = 1, 2, 3, \ldots$, $\Omega$ = electron cyclotron frequency (a function of the axial field) = $e\beta_{\|}|m\gamma$.

As can be seen, the interaction frequency, $\omega$, is proportional to the electron cyclotron frequency and inversely proportional to the difference in beam velocities.

The interaction frequency equation given above is derived below.

Two well intermingled electron beams of different axial velocities $v_{\|1}$ and $v_{\|2}$ are spun up and allowed to gyrate in a uniform axial magnetic field $B_{\|}$. As a result, the electron beams acquire transverse velocities $v_{\perp 1}$ and $v_{\perp 2}$.

The spun-up beams interact in a cylindrical drift tube which also acts as a waveguide. In this three-dimensional configuration, the wave vector $\vec{k}$ has both axial ($k_{\|}$) and transverse ($k_{\perp}$) components, with $k_{\perp}$ being determined by the beam radius and the transverse guide dimensions. Excitation of a space-charge wave ($\vec{E}_{rf} \| \vec{k}$) at the cyclotron frequency and its harmonics comes about solely because the transverse component of the RF electric field $E_{rf}$ exerts a tangential force on the electron in its helical motion. This orbit perturbation leads to harmonic generation. In order to achieve significant wave amplitude at a given harmonic, the perpendicular wavelength must be comparable in magnitude to the electron Larmor radius, or, $k_{\perp} v_{\perp}/\Omega \approx 1$. It should be noted that the type of two-stream instability discussed here differs from the conventional one characterized by frequency oscillations tied to the electron plasma frequency $\omega_p^2 = Ne^2/m_o e_o \gamma$ rather than the electron cyclotron frequency $\Omega$. Indeed, in such cases, calculations and the resulting microwave amplifier tubes are based on the assumption that $v_{\perp} \approx 0$, so that coupling to the electron cyclotron motion is of no concern.

Calculations of the wave frequency and growth rate are based on a solution of the relativistic Vlasov equation and Maxwell's equations in free space. In place of a fully self-consistent solution of the unneutralized two-beam system, a neutralizing background of infinitely massive ions is assumed. The wave with ($\vec{E}_{rf} \| \vec{k}$), and an $\exp[j(\omega t - \vec{k} \cdot \vec{r})]$ dependence has a linear (small signal) dispersion equation of the form, $K_L(k, \omega) = (\vec{k} \cdot K \cdot \vec{k})/k^2 = 0$, where K is the tensor dielectric coefficient and $K_L$ the effective longitudinal component given by $$K_L = 1 - \sum_{beams} \int_0^\infty dv_\perp v_\perp \int_{-\infty}^\infty dv_{\|} \frac{\omega_p^2}{k^2} 2\pi f_0 \times \qquad (2)$$

$$\sum_{m=-\infty}^{\infty} \left[ \frac{m\left(\frac{k_\perp}{v_\perp}\right)\frac{d}{dp}[J_m^2(p)]}{(\omega - k_{\|} v_{\|} - m\Omega)} + \frac{\left[k_{\|}^2 - \frac{(k_{\|} v_{\|} + m\Omega)^2}{c^2}\right] J_m^2(p)}{(\omega - k_{\|} v_{\|} - m\Omega)^2} \right] = 0.$$

Here $f_o = f_o(v_\perp, v_{\|})$ is the unperturbed velocity distribution function for each beam, and $J_m(p)$ is the mth order Bessel function with argument given by $p = k_\perp v_\perp/\Omega$. Assuming for simplicity that the two beams are completely superimposed and that they fill entirely a cylindrical waveguide of radius a, $k_\perp = \mu_{\iota,s}/a$ where $\mu_{\iota,s}$ is the sth root of $J_\iota(\mu) = 0$. Then, $$\begin{aligned} p &= \mu_{l,s} v_\perp / \Omega a \\ &= \mu_{l,s} r_L / a \end{aligned} \qquad (3)$$

where $r_L$ is the Larmor radius of the electron orbit ($r_L < a$). The values of $\iota$ and s select the waveguide mode. For the lowest mode with $TM_{o,1}$—like boundary conditions, $\mu_{\iota,s}=2.405$. For beams with cold electrons, the distribution function has the form, $$f_o(v_\perp, v_\parallel) = \frac{1}{2\pi v_{o\perp}} \delta(v_\perp - v_{o\perp})\delta(v_\parallel - v_{o\parallel}). \quad (4)$$

Substituting Eq. (4) in Eq. (2) yields the sought-after dispersion equation:

$$K_L = 0 = 1 - \quad (5)$$

$$\sum_{\text{beams}} \sum_{m=-\infty}^{\infty} \frac{\omega_p^2}{k^2} \left\{ \frac{\left[ k_\parallel^2 - \left( \frac{k_\parallel v_\parallel + m\Omega}{c} \right)^2 \right] J_m^2}{(\omega - k_\parallel v_\parallel - m\Omega)^2} + \frac{k_\perp^2 \{J_{m-1}^2 - J_{m+1}^2\}}{2\Omega(\omega - k_\parallel v_\parallel - m\Omega)} \right\}$$

In the case of one beam alone, the above dispersion equation shows that around each harmonic number $m\Omega = \omega - k_\parallel v_\parallel$, there are two narrow propagation bands, one above and one below each integral multiple of $\Omega$. The propagation bands extend approximately $\pm \omega_p J_m(p)$ on either side of $m\Omega$. The lower, slower branch around each harmonic is a negative energy wave, while the upper, faster wave is a positive energy wave. At high plasma densities ($\omega_p > m\Omega$) the negative energy wave of the mth harmonic can come into phase velocity synchronism with the positive energy wave associated with the $(m-1)$th harmonic, and a high frequency micro-instability can develop. However, this phenomenon is of little interest for the unneutralized electron beams considered here since such beams will become macroscopically unstable unless $\omega_p \leq \Omega/\sqrt{2}$.

The situation is different when two beams with different axial velocities interact with one another. Now, phase velocity synchronism can be achieved at low plasma densities $\omega_p < < \Omega$. For the case of almost paraxial propagation, $k_\parallel > > k_\perp$, the second term of Eq. (5) can be neglected; it is identically equal to zero when p is so chosen as to maximize $J_m(p)$. Then, the dispersion characteristics for each beam-cyclotron can be approximated by $$\omega \approx k_\parallel v_1 + m\Omega_1 \quad (6A)$$

$$\omega \approx k_\mu v_2 + n\Omega_2 \quad (6B)$$

The variables n and m are the harmonic of the cyclotron frequency of the two beams, respectively, and are equal to $\pm 1, \pm 2 \ldots$. Equations 6A and 6B yield $$\omega \simeq \frac{m\Omega v_{\parallel 2} - n\Omega v_{\parallel 1}}{v_{\parallel 2} - v_{\parallel 1}} \quad (7)$$

When n and m are unequal, the interaction frequency can be controlled to be much higher for a given axial field strength and electron beam velocities than was known in the prior art. The frequency upshift is particularly significant when one of n and m is positive and the other is negative, i.e., when the harmonic of one beam is positive and the other is negative. For example, if $n = -m$, Eq. 7 yields $$\omega \simeq \frac{v_{\parallel 2} + v_{\parallel 1}}{v_{\parallel 2} - v_{\parallel 1}} (m\Omega) \quad (8)$$

$$= 2(\beta_\parallel \gamma_\parallel)^2 (\gamma_\parallel / \Delta\gamma_\parallel)(m\Omega)$$

where now $\Omega$, $\beta_\mu$ and $\gamma_\parallel$ represent averages over the two beams. We note that, in the vicinity of the above frequency, $\omega \approx k_\parallel (v_1+v_2)/2$, the wave is dispersionless, and has a phase velocity equal to the average beam velocity.

It can be seen from equation (8) that, when $n = -m$, the sum of the electron beam velocities appears in the numerator of the interaction frequency equation while the difference of the electron beam velocities appears in the denominator. Accordingly, by making the beam velocities relatively close to one another, the denominator approaches zero, thus raising the interaction frequency. Accordingly, the interaction frequency can be made higher than is known in the prior art using the same axial field strengths and beam velocities.

The harmonics m and n can be set by selecting an appropriate interaction frequency for the system and injecting a wave at that frequency. For example, in the general case, the interaction frequency is given by the equation below.

$$\omega_{int} = \Omega(m\beta_{\parallel 2} - n\beta_{\parallel 1})/(\beta_{\parallel 2} - \beta_{\parallel 1})$$

For a given axial magnetic field (i.e., for a given $\Omega$) and given beam velocities (i.e., $\beta_{\parallel 1}$ and $\beta_{\parallel 2}$) the cyclotron harmonics of the first and second beams m and n, respectively, are set by injecting a large amplitude wave of the appropriate frequency into the system for amplification. If the injected amplitude is large enough, the chosen mode interaction, m, n, will tend to dominate.

The accompanying temporal growth rate is computed from Eq. (5) for complex $\omega$ and real k with the result that, for the case $n = -m$, $$\omega_i \approx \omega_p J_m(p)/2\gamma_\parallel$$

In deriving the growth rate, it is assumed that the two beams have equal plasma frequencies, or more precisely that $$\omega_{p1} J_m(p_1)/\gamma_{\parallel 1} = \omega_{p2} J_m(p_2)/\gamma_{\parallel 2} = \omega_p J_m(p)/\gamma_\parallel$$

For purposes of illustration two cases are considered: the case of interaction of two slow beams where relativistic effects are very small, and the case of two beams with mildly relativistic energies. In both cases the energy differences $\Delta\gamma_\parallel$ are taken to be considerably smaller than the mean beam energies, but much larger than the parallel thermal energy spreads expected in each beam. The results of the calculations are summarized in Table I. The conversion efficiency $\eta$ (at saturation) quoted in Table I is estimated from $\eta = \Delta\gamma_\parallel/(\gamma - 1)$.

TABLE 1

Summary of operating Parameters of a Double Stream Cyclotron Maser for $(\omega_p/\Omega)^2 = (1/9)$ and $(k_\perp V_\perp/\Omega) = 1.841$.

| PARAMETER | I | II |
|---|---|---|
| $V_{mean}(kV)$ | 87.5 | 275 |
| $\Delta V(kV)$ | 25.0 | 50 |
| $J(A/cm^2)$ | 23 | 100 |
| $B_z(kG)$ | 1.0 | 2.1 |

TABLE 1-continued

Summary of operating Parameters of a
Double Stream Cyclotron Maser for $(\omega_p/\Omega)^2 = (1/9)$ and $(k_\perp V_\perp/\Omega) = 1.841$.

| PARAMETER | I | II |
|---|---|---|
| $\omega/2\pi$(GHz) | 50 | 150 |
| Gain (dB/m) | 80 | 68 |
| efficiency $\eta$(%) | 29 | 18 |
| harmonic: m,n | 1,−1 | 1,−1 |
| waveguide mode | TM$_{01}$ | TM$_{01}$ |
| a(cm) | 0.5 | 0.5 |
| v⊥/c | 0.2 | 0.3 |

Table I shows that high frequency operation can be achieved at low beam energies and low magnetic field strengths. The instability growth rate is appreciable, but is limited (see Eq. (8)) by the need to maintain the ratio $\omega_p\Omega \leq 1\sqrt{2}$ (Brillouin condition), and thereby prevent beam break-up in the unneutralized system. Introduction of a cold background plasma to provide space-charge neutralization offers an interesting option. It allows an increase in $\omega_p$ which increases the growth rate, the beam current density and the rf power. In addition, by properly tuning the plasma density of the background plasma, the associated space charge wave can be made synchronous with the unstable beam cyclotron wave discussed above. This is readily seen by deriving the wave phase velocity (as found by setting $v_\perp v_\parallel = 0$ in Eq. (5)):

$$\left(\frac{\omega}{k_\parallel}\right)^2_{plasma} = \frac{(\omega^2 - \omega_p^2)(\omega^2 - \Omega^2)}{k_\perp^2(\Omega^2 - \omega^2 + \omega_p^2)}. \quad (9)$$

setting $(\omega/k_\parallel)$ plasma $\approx (v_1+v_2)/2$ assures phase velocity synchronism with the beam cyclotron wave of Eq. (7). This three wave interaction may enhance the bunching process.

These calculations are applicable to beams propagating in an assumed neutralizing background of stationary plasma ions. In the absence of the neutralizing plasma, the results are a good approximation provided that the beam plasma densities are sufficiently low, such that $(\omega_p/\Omega)^2 << 1$. As the density increases and the Brillouin condition $(\omega_p/\Omega)^2 = \frac{1}{2}$ is approached a self-consistent calculation is mandatory.

The present invention is substantially more compact and requires less beam energy and magnetic field strength than prior art double stream amplifiers, free electron masers and cyclotron masers.

The double stream instability which leads to the emission of radiation in the present invention differs from the instability of prior art double stream amplifiers. In prior art double stream amplifiers, the instability is characterized by frequency oscillations at the electron plasma density, $\omega_p = (Ne^2/m\epsilon_0\gamma)^{\frac{1}{2}}$, whereas, in the present invention, the instability is a function of the electron cyclotron frequency, $\Omega$ (which is a function of the axial field). Since electron plasma density fluctuates, prior art double stream amplifiers have relatively unstable output frequencies. However, the double stream cyclotron maser, or, more broadly, double stream cyclotron electromagnetic radiation amplification device, of the present invention has an extremely stable frequency output because the double stream instability is much less effected by space charge density fluctuations of the electron beam. Rather, it is dependent on the electron cyclotron frequency which is controlled by the axial field.

The axial magnetic field can be controlled extremely accurately.

Further, the present invention, by relying on the mutual interaction of charge density perturbations of two propagating beams traveling at different speeds rather than on relativistic effects as in a single stream cyclotron maser, can produce radiation at much higher frequencies than can be achieved with the same magnetic field strength and electron beam velocity in a single beam free electron maser or single beam cyclotron maser. Accordingly, the present invention is much more compact and consumes much less power than free electron lasers of the prior art.

The present invention is also superior to the prior art double stream electron cyclotron maser disclosed by Chunyi et al. in that, by setting the cyclotron harmonic numbers of the two electron beams unequal to each other, and particularly of opposite polarity, a significant increase in interaction frequency without the need for stronger magnetic fields and faster electron velocities is achieved.

Having thus described a particular embodiment of the invention, various alterations, modifications and improvements will readily occur to those skilled in the art. Such alterations, modifications and improvements are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An electromagnetic radiation amplification device comprising; means for producing first and second electron
    beams traveling in the same space in the same direction, said first electron beam having a velocity greater than said second electron beam and said first electron beam having a different electron cyclotron frequency harmonic than said second electron beam;
    means for producing a uniform axial magnetic field parallel to said direction of said electron beams; and
    means for producing a magnetic field transverse to said axial magnetic field which field initially imparts a transverse rotational component to electrons comprising said first and second electron beams.

2. An electromagnetic radiation amplification device as set forth in claim 1 wherein said electron cyclotron frequency harmonics of said first and second electron beams have the same absolute value.

3. An electromagnetic radiation amplification device as set forth in claim 2 wherein said electron cyclotron frequency harmonic of said first electron beam is positive one and said electron cyclotron frequency harmonic of said second electron beam is negative one.

4. An electromagnetic radiation amplification device as set forth in claim 1 further comprising an electron drift tube defining said space.

5. An electromagnetic radiation amplification device as set forth in claim 1 further comprising a waveguide for directing electromagnetic radiation produced in said space.

6. An electromagnetic radiation amplification device as set forth in claim 5 wherein said waveguide also comprises an electron drift tube which defines said space.

7. An electromagnetic radiation amplification device as set forth in claim 6 wherein said means for producing said axial magnetic field comprises a solenoid positioned around said space.

8. An electromagnetic radiation amplification device as set forth in claim 7 wherein said means for producing said transverse magnetic field comprises a magnetic wiggler including wire helically wrapped around a portion of said space and driven with an electric current.

9. An electromagnetic radiation amplification device as set forth in claim 8 further comprising means for injecting an electromagnetic wave into said space, said wave having a frequency at which amplification of said wave can occur in said space.

10. An electromagnetic radiation amplification device as set forth in claim 9 wherein said frequency is within the microwave frequency range.

11. An electromagnetic radiation amplification device comprising;
   an electron drift tube,
   a split cathode electron gun comprising first and second cathodes and an anode for introducing first and second electron beams, respectively, into said electron drift tube traveling in the same direction at first and second velocities, respectively,
   a solenoid positioned around said electron drift tube for producing an axial magnetic field in said electron drift tube parallel to said direction of said first and second electron beams,
   a magnetic wiggler wrapped around a portion of said electron drift tube and driven by an electric current so as to produce a magnetic field in said drift tube transverse to said direction of said electron beams which imparts a rotational component to electrons comprising said electron beams,
   a magnetron for producing an electromagnetic wave having a frequency at which amplification of said wave can occur in said electron drift tube, said frequency selected such that said first and second electron beams excite unequal cyclotron space charge harmonics, and
   means for directing said wave produced by said magnetron into said electron drift tube.

12. An electromagnetic radiation amplification device as set forth in claim 11 wherein said wave is selected such that said electron cyclotron frequency harmonics of said first and second electron beams have the same absolute value.

13. An electromagnetic radiation amplification device as set forth in claim 12 wherein said wave is selected such that said electron cyclotron frequency harmonic of said first electron beam is positive one and said electron cyclotron frequency harmonic of said second electron beam is negative one.

14. An electromagnetic radiation amplification device as set forth in claim 11 wherein said electron drift tube is dimensioned to function as a slow wave structure for electromagnetic radiation of said frequency of said wave produced by said magnetron.

15. An electromagnetic radiation amplification device as set forth in claim 14 wherein said frequency of said wave produced by said magnetron is in the microwave frequency range.

16. A method of amplifying electromagnetic radiation comprising the steps of:
   producing first and second electron beams having respectively different electron cyclotron frequency harmonics, said beams traveling in the same space in a first direction at relativistic velocities, said first electron beam having a velocity greater than said second electron beam;
   producing an axial magnetic field parallel to said first direction and in the same space with said electron beams; and
   producing a magnetic field transverse to said axial magnetic field in the same space with said electron beams which transverse field imparts a transverse rotational component to electrons comprising said first and second electron beams.

17. A method of amplifying electromagnetic radiation as set forth in claim 16 further comprising the step of injecting an electromagnetic wave into said space, said wave having a frequency at which amplification of said wave can occur in said space and said different electron cyclotron frequency harmonics of said first and second electron beams are supported.

18. A method of amplifying electromagnetic radiation as set forth in claim 17 further comprising the step of directing electromagnetic radiation present in said space.

19. An electromagnetic radiation amplification device as set forth in claim 1 wherein said means for producing said transverse magnetic field is positioned around only an initial portion of said device adjacent said means for producing.

20. An electromagnetic radiation amplification device as set forth in claim 11 wherein said magnetic wiggler is wrapped only around a portion of said electron drift tube adjacent said electron gun.

* * * * *